H. DEBAUGE.
PROCESS AND APPARATUS FOR PURIFYING CAOUTCHOUC.
APPLICATION FILED APR. 6, 1915.

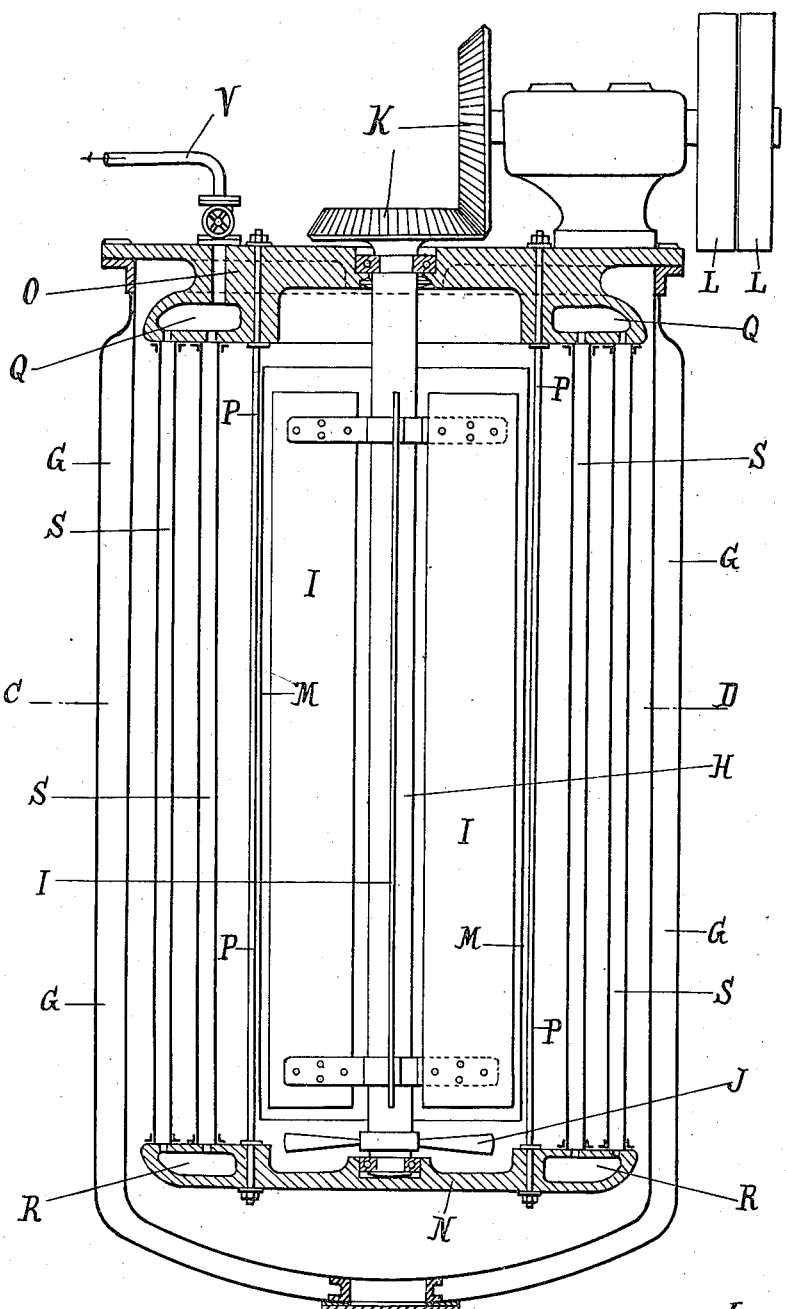

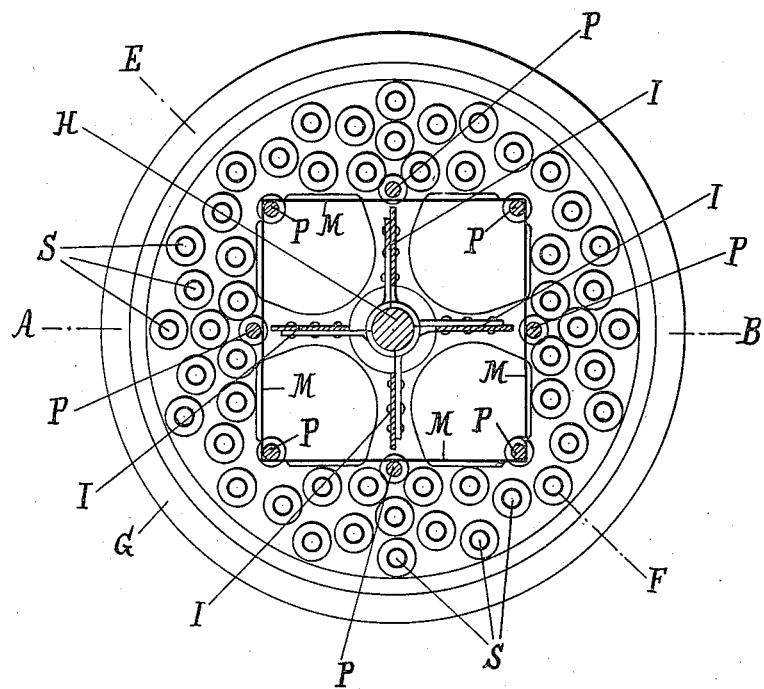

1,153,040.

Patented Sept. 7, 1915.
3 SHEETS—SHEET 3.

Inventor:
Henry Debauge,
By Attorneys,
Fraser, Trick & Myers

UNITED STATES PATENT OFFICE.

HENRY DEBAUGE, OF PARIS, FRANCE.

PROCESS AND APPARATUS FOR PURIFYING CAOUTCHOUC.

1,153,040.  Specification of Letters Patent.  Patented Sept. 7, 1915.

Application filed April 6, 1915. Serial No. 19,527.

*To all whom it may concern:*

Be it known that I, HENRY DEBAUGE, a citizen of the Republic of France, and a resident of Paris, France, have invented certain new and useful Improvements in Processes and Apparatus for Purifying Caoutchouc, of which the following is a specification.

In specification of U. S. Patent 1,136,462, granted Apr. 20, 1915, are described a process and apparatus for purifying solutions of caoutchouc by separating out matters such as resins, sulfur, tar and the like which are soluble in hydrocarbons; and is explained the application of the process and apparatus in particular for regenerating vulcanized caoutchouc by dissolution in a hydrocarbon and drawing off by osmosis from this solution, as the operation advances, the sulfur remaining from the vulcanizing process which is always liberated during the dissolution.

The present invention consists in improvements in the process and apparatus described and claimed in the above cited specification. It is based on the fact that the dissolution of caoutchouc is so much more favorable from a regeneration point of view if the solution be slightly heated and the operation be of short duration. The principle on which the process of de-vulcanizing followed in these apparatus is founded, is that the vulcanized caoutchouc can only be dissolved in depolymerizible liquids; the further depolymerization is carried and the more complete and fluid the dissolution, the greater the quantity of sulfur liberated.

In a former apparatus which has been tried, heat is almost entirely depended on to produce depolymerization; the improved apparatus, object of this invention, makes use, simultaneously, of heat and a mechanical action, and is based on the result of experience that mechanical action alone suffices to produce dissolution, although the final result may be so much the more quickly obtained as the temperature is raised.

The mechanical action consists in a very energetic agitation which sets up rubbing actions between the grains and the liquid, and between grains and the walls of the vat. This agitation can be produced in any suitable manner; it may be replaced by an attrition action between cylindrical members or agitators turning in opposite directions.

The apparatus now to be described, by way of example, with reference to the accompanying drawings, operates in a very satsifactory manner.

Figure 4:
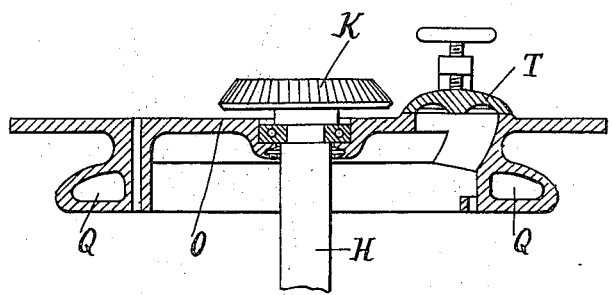
Figure 3:
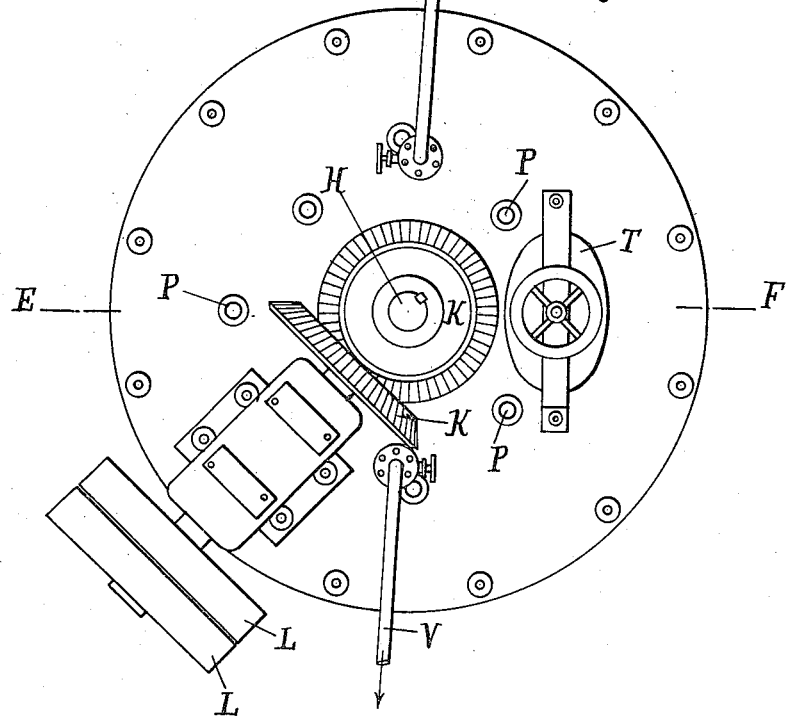

Figure 1 in the drawing is a vertical longitudinal section on the line A B of Fig. 2. Fig. 2 is a horizontal section on the line C D of Fig. 1. Fig. 3 is a plan of the cover. Fig. 4 is a cross section of the cover on lines E F in Figs. 2 and 3.

In a cylindrical vat, having a steam jacket G, is axially mounted a shaft H on which are radially arranged four vanes I. At the bottom of the vat is a small screw J; the shaft H is driven by means of bevel wheels K, on the spindle of one of which are fast and loose pulleys L. The shaft H with the vanes I can then be turned within the four sheet metal walls M M arranged at right angles with one another in a manner to form a quadrangular cell a little longer than the vanes I. The part of the apparatus just referred to constitutes the mechanical agitating device for facilitating the dissolution.

Around the quadrangular vessel M are arranged osmotic or porous tubes in the following manner: Two plates N and O, which may be of cast iron, are connected together by a series of rods P P which retain the plates at a fixed distance apart and render the whole arrangement firm. Ducts Q R in the plates communicate by means of a series of orifices with the porous connecting tubes S S that are parallel with the axis of the vat. Moreover, orifices conveniently disposed with regard to the plates allow the liquid which is in the central part of the vat, and which is urged to descend toward the bottom by the action of the screw J, to pass into the part where the porous tubes S surrounding the quadrangular vessel M are.

U denotes the inlet for the osmotic liquid and V the outlet.

The dissolution operation occurs as follows:—The caoutchouc, which has been preferably treated while cold with xylol, for the double purpose of extracting from it the greater part of the soluble matters (resins, sulfurs, tar and the like) and to impregnate it (with the xylol) to render it friable and easy to pulverize, is put into the dissolution vat through the opening T, with a suitable quantity of xylol. The quantity of xylol should be such that a final solution is obtained containing 5 to 10% of caoutchouc and consequently 90 to 95% of xylol. The xylol can be replaced by any solvent of caoutchouc. Steam is admitted into the outer jacket to raise the temperature of the mass of liquid to about 100 to 110° C. Pulleys L L are driven in a manner to impart to shaft H a sufficiently high speed (from 300 to 500 turns according to circumstances) whereupon a very sluggish current of xylol is set up from the lower duct R to the upper duct Q, so as to draw out the vulcanization sulfur from the caoutchouc which the gradual dissolution liberates and which passes through the porous tubes.

The object of the rapid rotation of the vanes I I, which throw the liquid with force against the walls of the vessel M M, is to break to pieces by degrees the grains of caoutchouc and to eradicate them as much as possible by rubbing them against the walls, as well as against one another and the liquid. There is thus set up the desired energetic agitation of the whole mass.

The small screw J at the lower part is for the purpose of imparting to the whole mass of liquid an axially directed descending movement, and an ascending movement against the osmotic tubes and the heated walls. This regular displacement of the liquid is necessary to obtain a uniform heating and a frequent renewal of the portion of liquid in contact with the porous tubes.

Claims:

1. Process of purifying caoutchouc, comprising attriting the caoutchouc in the presence of a solvent and subjecting the solution of the caoutchouc to dialysis.

2. Process of purifying caoutchouc, comprising heating and attriting the caoutchouc in the presence of a solvent and subjecting the solution of the caoutchouc to dialysis.

3. Process of purifying caoutchouc, comprising heating, circulating and attriting the caoutchouc in the presence of a solvent and subjecting the solution of the caoutchouc to dialysis.

4. An apparatus for use in purifying caoutchouc, comprising a receptacle, a mechanical attriting device therein, and osmotic separators.

5. An apparatus for use in purifying caoutchouc, comprising a receptacle, means for heating said receptacle, a mechanical attriting device therein, and osmotic separators.

6. An apparatus for use in purifying caoutchouc, comprising a receptacle, means for heating said receptacle, means for circulating the contents of the receptacle, a mechanical attriting device therein, and osmotic separators.

7. An apparatus for use in purifying caoutchouc, comprising a receptacle, a mechanical attriting device therein, and osmotic tubes around said attriting device.

8. An apparatus for use in purifying caoutchouc, comprising a receptacle, a mechanical attriting device therein, and osmotic separators, said attriting device comprising a polygonal cell and a rotary bladed shaft.

In witness whereof, I have hereunto signed my name in the presence of two subscribing witnesses.

HENRY DEBAUGE.

Witnesses:
 DEM. C. POOLE, Jr.,
 CHARLES MARDELE.